US007202313B2

(12) United States Patent
Jorgensen et al.

(10) Patent No.: US 7,202,313 B2
(45) Date of Patent: Apr. 10, 2007

(54) CHROMIUM-BASED CATALYSTS IN MINERAL OIL FOR PRODUCTION OF POLYETHYLENE

(75) Inventors: Robert J. Jorgensen, Scott Depot, WV (US); Karen E. Breetz, Morgantown, WV (US); Jose Fernando Cevallos-Candau, Charleston, WV (US); Dale A. Wright, Charleston, WV (US); Thomas E. Spriggs, Cross Lanes, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 10/543,980

(22) PCT Filed: Mar. 4, 2004

(86) PCT No.: PCT/US2004/006505

§ 371 (c)(1),
(2), (4) Date: Jul. 29, 2005

(87) PCT Pub. No.: WO2004/094489

PCT Pub. Date: Nov. 4, 2004

(65) Prior Publication Data

US 2006/0155081 A1 Jul. 13, 2006

Related U.S. Application Data

(60) Provisional application No. 60/458,631, filed on Mar. 28, 2003.

(51) Int. Cl.
*C08F 4/22* (2006.01)
(52) U.S. Cl. .................... 526/104; 526/352; 526/126
(58) Field of Classification Search ................ 526/352, 526/104, 126
See application file for complete search history.

(56) References Cited

U.S. PATENT DOCUMENTS

| 3,998,996 | A | * | 12/1976 | Toth ........................ 526/114 |
| 4,548,915 | A | * | 10/1985 | Goodall et al. ............. 502/104 |
| 5,034,364 | A | * | 7/1991 | Kral et al. ................. 502/117 |
| 5,169,816 | A | | 12/1992 | Dawkins |
| 5,198,400 | A | | 3/1993 | Katzen et al. |
| 5,310,834 | A | | 5/1994 | Katzen et al. |
| 5,922,818 | A | | 7/1999 | Morterol |
| 6,022,933 | A | * | 2/2000 | Wright et al. ............... 526/68 |

FOREIGN PATENT DOCUMENTS

| DE | 2417150 | 11/1975 |
| WO | WO 97/27225 | 7/1997 |
| WO | WO00/47640 | 8/2000 |

* cited by examiner

*Primary Examiner*—Ling-Sui Choi

(57) ABSTRACT

A process for polymerizing polyethylene with chromium-based catalysts wherein one or more supported chromium-based catalysts is mixed with mineral oil to form a slurry and the slurry is then introduced into a polymerization reactor, especially a gas-phase polymerization reactor.

8 Claims, 1 Drawing Sheet

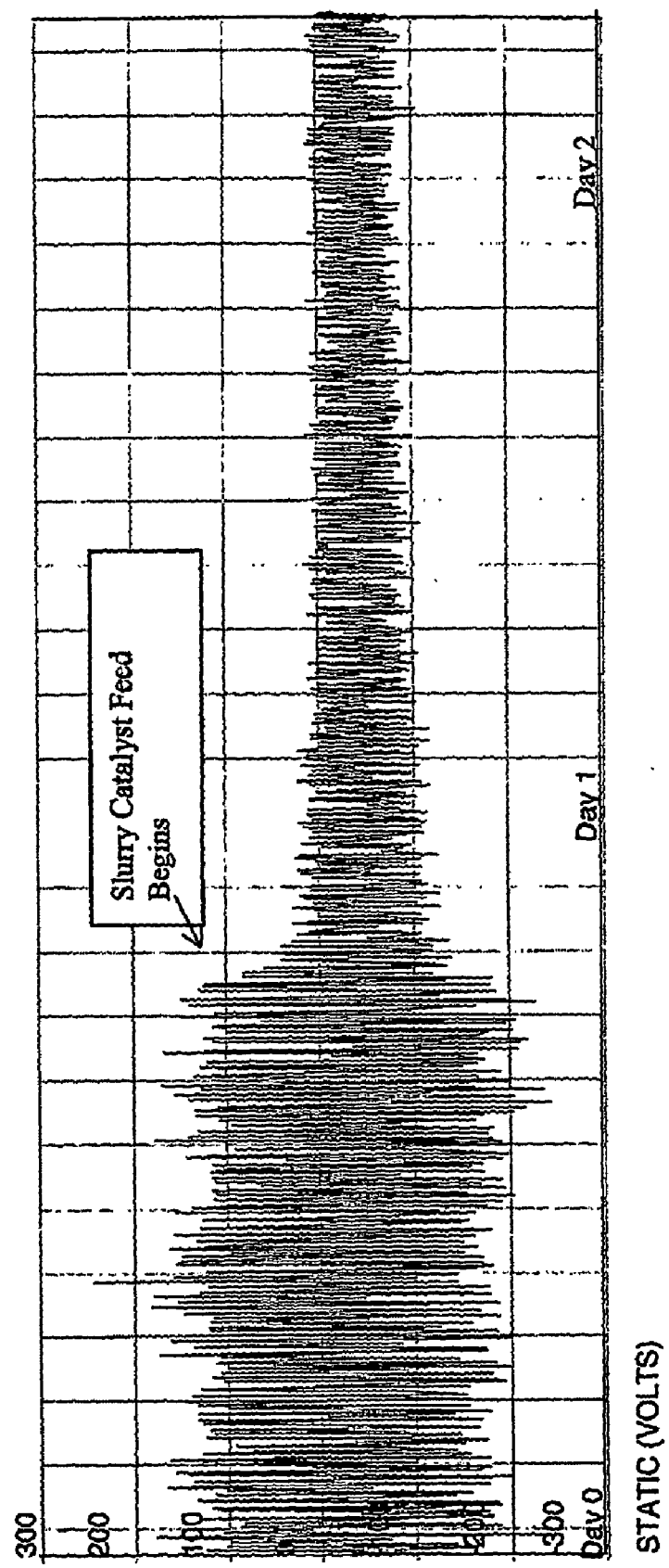

CHROMIUM-BASED CATALYSTS IN MINERAL OIL FOR PRODUCTION OF POLYETHYLENE

CROSS REFERENCE STATEMENT

This application claims the benefit of U.S. Provisional Application No. 60/458,631, filed Mar. 28, 2003.

BACKGROUND OF THE INVENTION

This invention relates generally to ethylene polymerization, and more specifically to methods and apparatus for use of chromium-based catalysts for the production of polyethylene in a gas phase polymerization reactor, and in particular, chromium based catalysts which are chromium oxide based.

In gas phase polymerization reactions, it is generally accepted that slurry catalyst feed is more reliable and easily controlled than dry catalyst feed. From a mechanical standpoint, slurry feeders are much simpler than dry feeders. Feeding and precisely metering a fluid (the catalyst slurry) is simpler than attempting to convey a solid catalyst stream into the polymerization reactor at high differential pressure with precision control of feed rates. Thus, a solid catalyst feeder is more complicated in design and maintenance. Slurry feeders, on the other hand, are simpler in design and provide a positive means of controlling and measuring the feed rate of catalyst into the polymerization reactor. This translates into lower maintenance costs and less downtime. Furthermore, the precise control of catalyst feed rate available with slurry feeders helps mitigate the risk of runaway reactions and sheeting in these polymerization reactors. Also, if dry catalyst feeders could be eliminated from the reactor design package, the start-up cost for a new plant would be substantially reduced.

Slurry catalysts are used in other polymerization processes, notably the "Phillips Slurry Loop" type process, however these catalysts are fed as concentrated "muds" in the polymerization solvent, typically in "shots". This type of catalyst feed is not useful in Gas Phase polymerizations due to the large sizes of these shots and the difficulty encountered in dispersing such a large amount of catalyst within the gas phase polymerization reactor.

Despite this utility, however, with chromium-based catalysts, such as supported silylchromate and chromium oxide catalysts, slurry catalyst feed was not pursued. Due to the specific nature of the gas phase polymerization process, the catalyst must remain in suspension in the slurry solvent without significant settling, without agitation, for periods of 5 minutes to 1 hour. Since solvents used in "mud" feeding in Slurry Polymerization reactors are normally light hydrocarbons, such as isobutane, hexane, or isopentane, these solvents would not meet this criteria. Additionally, certain chromium based catalysts contain $Cr^{+6}$ which can chemically oxidize slurry solvents, resulting in changes in catalyst performance over time.

Because of these requirements, the use of a higher viscosity slurry solvent, typically a mineral oil, has been required in practice. It was also believed that either impurities in the mineral oil, the typical slurry solvent used for catalyst feed to Gas Phase polymerization reactors, or reaction of the $Cr^{+6}$ species in the catalyst with the mineral oil itself could unfavorably alter the catalyst. Since one of the objects of the invention is improved catalyst feed control and commonality of equipment, the use of the same diluent for all catalyst families used in the polymerization reactor is highly desirable.

Furthermore, if slurrying the chrome-based catalysts in mineral oil would work, other opportunities to improve chrome-catalyzed resins would become feasible. One such possibility is to mix dissimilar but chemically compatible catalysts, such as, for example, supported silylchromate catalysts with chromium oxide catalysts before entering the polymerization reactor. Blending studies of resins made from both catalysts have suggested that various mixtures would exhibit improved product properties. For instance, a chromium oxide resin that is used for blow molding applications (for example, a polymer with a 0.953 g/cm³ density and 37 dg/min flow index (FI) has good stiffness and processability, but the environmental stress crack resistance (ESCR) is deficient. A resin produced a from silylchromate catalyst has excellent ESCR, largely due to its broadened molecular weight distribution (MWD), but has excessive bottle swell for many blow-molding applications. Feeding both catalysts separately from dry feeders is an option, however the ability to control both the absolute amount of each catalyst fed as well as the ratio of the two catalysts is extremely difficult using dry feeding techniques.

Static generation is also an area of concern for gas phase polymerization reactions. It is known that high levels of static are deleterious to continuous operation Static can be generated by a variety of means, including conveying of dry catalyst into the reactor. In practice, dry catalyst feeders inject catalyst at a high velocity into the fluidizing bed through an injection tube. This high velocity injection of a dry powder, particularly an insulating powder such as a silica supported catalyst, can conceivably generate static. One possible means to reduce static would be to use a liquid catalyst carrier to prevent charge generation. Another advantage then, of slurry feed of a chrome based catalyst to a gas phase reactor is the potential to reduce static in operation.

U.S. Pat. No. 5,922,818 claims a process to store a catalyst under an inert atmosphere, mix it in a hydrocarbon, and feed the suspension into a gas-phase polymerization reactor. U.S. Pat. No. 5,034,364 discusses the mixing of chromium catalysts by depositing both species (chromium oxide and silylchromate) onto the same substrate, but it does not mention use of separate supports for each catalyst or feeding a catalyst mixture to the reactor as a slurry. Two related patents, U.S. Pat. No. 5,198,400 and U.S. Pat. No. 5,310,834, discuss mixed chrome catalysts on separate supports but do not mention forming a slurry of a mixture. U.S. Pat. No. 5,169,816 discusses the deposition of various chrome species on an inorganic oxide support, preferably for use as a dry, free-flowing powder. WO 97/27,225 discusses mixing separate chromium catalyst species for polyethylene polymerization but does not disclose forming a slurry of the resulting mixture.

For purposes of United States patent practice, the contents of any patent or publication disclosed herein are incorporated by reference herein.

SUMMARY OF THE INVENTION

According to the present invention there is provided a process for making polyethylene, the process comprising the steps of:
(A) mixing (i) at least one chromium-based catalyst on a silica support with (ii) mineral oil to form a slurry wherein the mineral oil has a viscosity of at least 40 cP at 40° C.; and (B) introducing the slurry into a polyethylene polymerization reactor.

In another embodiment, here is provided a process for making polyethylene, the process comprising the steps of: mixing (i) at least one chromium oxide catalyst; (ii) at least one silylchromate catalyst; and (iii) mineral oil having a viscosity of at least 40 cP to form a slurry; and introducing the slurry into a polyethylene polymerization reactor under polymerization conditions.

BRIEF DESCRIPTION OF THE DRAWING

FIG. 1 is a plot of static voltage measured in the gas phase reactor of Example 13.

DETAILED DESCRIPTION OF THE INVENTION

This invention involves an advantageous method to feed chromium-based catalysts to a polymerization reactor in slurry form. The chromium-based catalysts are preferably either chromium oxide catalysts, silylchromate catalysts, or, more preferably, a combination of both chromium oxide and silylchromate catalysts.

The chromium oxide catalysts may be $CrO_3$ or any compound convertible to $CrO_3$ under the activation conditions employed Compounds convertible to $CrO_3$ are disclosed in U.S. Pat. Nos. 2,825,721; 3,023,203; 3,622,251; and, 4,011,382 and include chromic acetyl acetone, chromic chloride, chromic nitrate, chromic acetate, chromic sulfate, ammonium chromate, ammonium dichromate, or other soluble, chromium containing salts.

The silylchromate catalysts are characterized by the presence of at least one group of

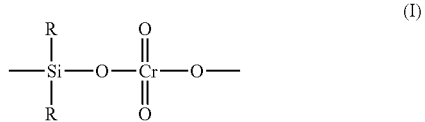
(I)

wherein R, each occurrence, is a hydrocarbyl group having from 1 to 14 carbon atoms. Among the preferred compounds having the group of Formula I are the bis-trihydrocarbylsilylchromates of Formula II:

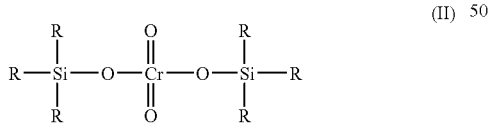
(II)

where R is defined as above. R can be any hydrocarbon group such as an alkyl, alkaryl, aralkyl or an aryl radical containing from 1 to 14 carbon atoms, preferably from 3 to 10 carbon atoms. Illustrative thereof are methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, and dimethylnaphthyl. Illustrative of the preferred silylchromates, but by no means an exhaustive or complete list of those which can be employed in this process, are bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, and polydiethylsilylchromate. Examples of such catalysts are disclosed, for example, in U.S. Pat. Nos. 3,324,101; 3,704,287; and 4,100,105.

The chromium based catalysts of the current invention are deposited onto conventional catalyst supports or bases, for example, inorganic oxide materials. The inorganic oxide materials which may be used as a support in the catalyst compositions of the present invention are porous materials having a high surface area, for example, a surface area in the range of 50 to 1000 square meters per gram, and a particle size of 20 to 200 micrometers. The inorganic oxides which may be used include silica, alumina, thoria, zirconia, aluminum phosphate and other comparable inorganic oxides, as well as mixtures of such oxides. When both chromium oxide-based catalysts and silylchromate-based catalysts are employed together in this invention, each catalyst is deposited on a separate support.

Processes for depositing the catalysts on supports are known in the art and may be found in the previously disclosed publications. The chromium-based catalyst is usually deposited on the support from solutions thereof and in such quantities as to provide, after the activation step, the desired levels of chromium in the catalyst. After the compounds are placed on the supports and are activated, there results a powdery, free-flowing particulate material.

Activation of the supported chromium oxide catalyst can be accomplished at nearly any temperature up to its sintering temperature. The passage of a stream of dry air or oxygen through the supported catalyst during the activation aids in the displacement of any water from the support and converts, at least partially, chrome species to $Cr^{+6}$. Activation temperatures of from 300° C. to 900° C. for periods of from greater than 1 hour to as high as 48 hours are acceptable. Well dried air or oxygen is used and the temperature is maintained below the sintering temperature of the support.

The slurry diluent used in the current invention is mineral oil having a viscosity of at least 40 cP at 40° C., preferably greater than 60 cP at 40° C. Preferably, the mineral oil is substantially free of impurities which may deleteriously interact with or kill the catalyst. As such, the mineral oil should be at least 99.5 percent pure, preferably >99.9 percent pure and more preferably approximately 100 percent pure. Suitable mineral oils include Kaydol®, Hydrobrite® 550, and Hydrobrite® 1000, available from Crompton Chemical Corporation.

The chromium-based catalyst(s) are mixed with the mineral oil in any convenient ratio that results in a slurry having a viscosity suitable for use herein and that provides sufficient slurry stability that the catalyst solids do not separate from the mineral oilduring use. Preferably, the slurry contains as much catalyst as possible within these constraints. Satisfactory results have been achieved with slurries containing from 10 to 20 percent by weight (wt. percent) of supported chromium-based catalyst, based on the total weight of the slurry. Such slurries generally have viscosities in the range generally less than 10000 cP at a shear rate of 10 $s^{-1}$ when measured at 25° C. using a Brinkmann viscometer.

The slurry optionally contains a scavenger. The scavenger can be any substance that consumes or inactivates traces of impurities or poisons in the slurry but does not undesirably decrease the activity of the catalyst(s). Known scavengers include organometallic compounds, such as aluminum alkyls (for example, triisobutylaluminum, diethyl aluminum ethoxide, isobutylalumoxane and various methylaluminoxanes).

The slurry may optionally contain a chain transfer agent. Such chain transfer agents are well known in the art and include diethyl zinc (DEZ) and triethyl borane. The chain transfer agent may also act as a scavenger to deactivate catalyst poisons.

The catalyst slurry can be fed into the polymerization reactor using any suitable liquid delivery system. Typically, the slurry will be introduced into the reactor via a high pressure syringe system or other positive displacement device. One typical device is a progressive cavity pump, such as a Moyno® pump, which is highly suitable for moving slurries of high viscosity and generation of high pressures. Such positive displacement devices provide for accurate and precise delivery rates. An important feature of the invention is the ability to introduce catalyst into the polymerization reactor in an essentially continuous fashion, as opposed to "shots" as practiced with dry catalyst feeds.

The catalyst slurry may be used for the polymerization of olefins by any suspension, solution, slurry, or gas phase process, using known equipment and reaction conditions, and is not limited to any specific type of reaction system. Generally, olefin polymerization temperatures range from 0° C. to 200° C. at atmospheric, subatmospheric, or superatmospheric pressures. Slurry or solution polymerization processes may use subatmospheric or superatmospheric pressures and temperatures in the range of 40° C. to 115° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is non-reactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, and toluene. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000 psi (7 kPa–7 MPa), preferably 50 to 500 psi (340 kPa–3.4 MPa), most preferably 100 to 450 psi (700 kPa–3.1 MPa), and temperatures in the range of 30 to 130° C., preferably 65 to 115° C. Stirred or fluidized bed gas phase reaction systems are particularly useful. In the gas fluidized bed polymerization of olefins, the polymerization is conducted in a fluidized bed reactor wherein a bed of polymer particles is maintained in a fluidized state by means of an ascending gas stream comprising the gaseous reaction monomer. The polymerization of olefins in a stirred bed reactor differs from polymerization in a gas fluidized bed reactor by the action of a mechanical stirrer within the reaction zone which contributes to fluidization of the bed. The start-up of such a polymerization process generally employs a bed of preformed polymer particles similar to the polymer which it is desired to manufacture. During the course of polymerization, fresh polymer is generated by the catalytic polymerization of the monomer, and polymer product is withdrawn to maintain the bed at more or less constant volume. An industrially favored process employs a fluidization grid to distribute the fluidizing gas to the bed, and also to act as a support for the bed when the supply of gas is cut off. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons.

Many advantages are achievable with the inventive chromium-based catalyst mineral oil slurry. First, slurry catalyst feed is known to be more reliable and controllable than dry catalyst feed systems. Second, the slurry diluent (a high viscosity mineral oil) desirably acts as a processing aid for the final polymer product. Third, catalyst induction time can be reduced since the mineral oil surrounding the catalyst as it enters the reactor acts to absorb ethylene, thus increasing the local ethylene concentration and increasing initiation rate. Fourth, the slurry diluent, which is imbibed in the pores of the silica support, will also increase the apparent density of the catalyst particles, increasing retention in the fluidized bed and reducing the amount of catalyst rich fines carryover. A reduction in fines carryover not only enhances operability of a reactor (due to less fouling) but also improves overall product quality by reducing the amounts of gels in the final products. (Gels are believed to be caused by fines that continue to react at lower temperatures on the walls of the reactor expanded section.) Better control of production rate through use of continuous rather than intermittent catalyst feed will help minimize the number of sheeting incidents, which is especially valuable when using high activity chromium-based catalysts. Slurry catalyst feed also has the potential to reduce static generation in the fluidized bed which is important for minimization of sheeting. Finally, the use of slurry feeders for chromium-based catalysts would eliminate the need for dry feeders and thus decrease the capital cost for the start-up of a polymerization system.

To take this slurry and mixed chromium catalyst technology one step further, a modifying agent could be added to the catalysts slurried in mineral oil (separately or mixed) before the catalyst reaches the polymerization reactor. Included here would be:

(1) Co-feed of a catalyst reducing agent with chromium oxide catalysts to decease the induction period normally experienced within this family of catalysts. Exemplary compounds are $AlR_{a(3-x)}R_x$ where $R_a$ can be a $C_1$–$C_{20}$ hydrocarbon radical and $R_b$ an alkoxy radical of 1–20 carbons, as well as ethyl-, methyl- and isobutyl-alumoxanes. Also useful are compounds such as $MgR_{a2}$, where $R_a$ is as defined above. Especially useful compounds are diethylaluminum ethoxide, ethylalumoxane, triisobutylaluminum, triethylaluminum, tri-n-hexyl aluminum, tri-n-octyl aluminum and isobutylalumoxane. While not being bound by any one theory, chromium-based catalysts, particularly those produced with or converted to $Cr^{+6}$ compounds tend to have an induction period prior to initiation of polymerization. This is thought to be due to reduction of the $Cr^{+6}$ (to $Cr^{+3}$ by olefin which is believed to generate the active site. Use of the above mentioned reducing agents results in a uniform conversion of the catalyst from its inactive state to a fully active state, essentially eliminating the induction period. Apparatus such as that described in U.S. Pat. No. 6,187,866 is suitable for eliminating the induction period of a catalyst, and its use is especially important when operating at very high rates, particularly in condensing mode. Advantages include the ability to achieve increased catalyst productivity since the catalyst will spend more "active" time in the reactor since the reduction in the reactor will be eliminated; decreased propensity for sheeting and fouling since the catalyst particles will be fully active upon entry to the reactor, minimizing the probability that the catalyst will be carried out of the polymerizing fluid bed before activation and initial particle growth; the ability to counteract poisons via co-feed of poison scavengers; and the ability to modify molecular weight distribution by co-feed of chain transfer agents such as diethyl zinc or triethyl borane.

(2) In-situ production of silylchromate type catalysts in which the reducing agent is added to a slurry of supported chromate species. Since it is known that the reduction ratio affects a number of polymerization properties, in-situ production of this type of catalyst allows for on-line control of polymerization properties and increased user flexibility to change catalyst formulation on-line to account for purity variations in the ethylene polymerization feedstreams. Similar to embodiment 1, chain transfer agents can be added to this embodiment of the catalyst composition as well.

The invention is further described in the following examples which are provided for illustration only and are not to be construed as restricting the subject matter of the invention.

EXAMPLES

Catalyst 1a and 1b

Chromium oxide based catalysts are made as described in EP 0640625 A2. Catalyst 1a is available as UCAT™ B-300 and Catalyst 1b is available as UCAT™ Catalyst B-375 from Univation Technologies LLC. These catalysts differ in the amount of chromium present on the silica support and hence the final amount of $Cr^{+6}$ present in the finished catalyst. As described in EP 0640625 A2, such catalysts may be prepared by the following multi-step procedure:

Step 1: (Drying)—A chromium acetate containing silica (0.2 wt.percent Cr for Catalyst 1a and 0.5 wt. percent Cr for Catalyst 1b, having 70 percent of its pore volume in pore size greater than 100 Angstroms (Davison® 957 brand silica, available from Grace-Davison Corporation) is introduced into a fluid-bed drying vessel maintained under nitrogen at ambient temperature and pressure. The temperature of the vessel is increased to 150° C. at a rate of 50° C./hour. The silica is held at 150° C. for 4 hours and then cooled to below 100° C. for 2 to 3 hours.

Step 2: (Titanation)—190 Kg of the product of Step 1 is charged to a jacketed mixing vessel. For each Kg of the product of Step 1, 5.4 liters of isopentane are added to the contents of the vessel with stirring and increasing the jacket temperature to 55° C. After the temperature reached 55° C., 0.55 liters of 50 wt. percent tetra-isopropyltitanate (TIPT) in hexane are added for each kilogram of the product of Step 1. The vessel is pressurized from atmospheric to 4.1 atmospheres and allowed to mix for 2 hours. The jacket temperature is increased to 90–100° C. and the pressure is reduced to 1.15 atmospheres allowing the isopentane and hexane solvents to evaporate. Two hours after the pressure is released, the mixture is purged through the bottom of the vessel with 18 Kg/hour of nitrogen for up to 24 hours.

Step 3. (Activation)—Under good fluidization, the product of Step 2 is heated from ambient temperature to 150° C. at a rate of 50° C./hour under nitrogen. It is then heated at 150° C. for 2 hours followed by increasing the temperature from 150° C. to 325° C. at a rate of 50° C./hour in nitrogen. The product is maintained at 325° C. for 2 hours in nitrogen and then 1 hour in air. The temperature is increased from 325° C. to 825° C. at a rate of 100° C. in air and maintained at 825° C. for 6 hours in air. The temperature is then decreased as fast as possible to 300° C. in air. At 300° C., the air is changed to nitrogen, and the temperature is decreased to ambient temperature as fast as possible.

Catalyst 2

A silylchromate based catalyst (Catalyst 2) is produced by methods described in U.S. Pat. No. 6,022,933 and U.S. Pat. No. 3,704,287. Catalyst 2 is the silicon dioxide supported reaction product of triphenylsilylchromate and diethylalumium ethoxide having an aluminum/chromium atomic ratio of 1.5:1 and available as UCAT™ UG-so from Univation Technologies LLC. Catalyst 2 may be prepared as follows:

1) A silica support (Davison® 0955, available from Grace-Davison Corporation) is dehydrated in air in a fluidized bed at a temperature of 600° C. for a minimum of 2 hours at temperature. During cooling, air is replaced with nitrogen.

2) The dried support is added to purified isopentane at an approximate 3 grams solvent/gram support ratio. Sufficient bistriphenylsilylchromate is added to the slurry to obtain a total chromium content of 0.25 wt. percent. This slurry is mixed at 45° C. for 10 hours.

3) Diethylaluminum ethoxide is added to the slurry in a molar ratio of 1.5 to the Cr. The mixture is stirred at 45° C. for 2 hours and then dried at a jacket temperature of 70° C. for a further 24 hours. The dry free flowing powder is then stored under nitrogen until use.

Slurry Preparation

Mineral oil slurries of catalysts 1a and 1b containing 13 weight percent of each supported catalyst were prepared by adding the solid powder to the oil and stirring. A 10 weight percent slurry of catalyst 2 was similarly prepared. Finally, a 13 weight percent mineral oil slurry was prepared of a mixture of 70/30 weight ratio mixture of catalyst 1b and catalyst 2. The mineral oil used in preparing the slurries was Kaydol®, available from Crompton Chemical Corporation, and having a viscosity at 40° C. of at least 40 cP.

Viscosity Testing

Viscosities of the resulting slurries measured using a Model LV viscometer with spindle number SC4–31 available from Brookfield Engineering Laboratories, indicated the resulting mixtures were suitable for further use and testing.

Dry Powder Testing

A mixture is made of 50 percent Catalyst 1b and 50 percent Catalyst 2 as dry powders. The mixture is made in a dry nitrogen atmosphere, free of contaminants. While both Catalyst 1b and Catalyst 2 are free flowing dry powders, the mixture appears clumpy and sticky. The solid mixture does not flow freely. The mixture is incapable of use in a dry catalyst feeder.

Examples 1–12

Catalyst activities are tested in lab scale autoclave polymerization reactors in the absence and in the presence of diethyl zinc scavenger (mole ratio Zn:Cr=1:1) and in the presence of triethyl aluminum (TEA) (50 μl of a 1 mole percent TEA hexane solution for Examples 1 and 2, 25 μl for Examples 3–6). Results (shown in Table 1) indicate that all catalyst slurries have acceptable activities.

TABLE 1

Activity Results for Catalyst Slurries

| | Example | | | | | |
|---|---|---|---|---|---|---|
| | 1 | 2 | 3 | 4 | 5 | 6 |
| Catalyst Slurry | 1a | 1a | 2 | 2 | mixed | mixed |
| Diethyl Zinc | no | yes | no | yes | no | yes |
| 1 percent TEA solution, μl | 50 | 50 | 25 | 25 | 25 | 25 |

TABLE 1-continued

Activity Results for Catalyst Slurries

| | Example | | | | | |
|---|---|---|---|---|---|---|
| | 1 | 2 | 3 | 4 | 5 | 6 |
| Activity, g PE/g catalyst | 856 | 1414 | 450 | 788 | 300 | 550 |
| Standard activity, g PE/g catalyst | 2674 | — | 450 | — | n/a | n/a |

SEC analysis of the resulting polymer samples indicate that in the mixed catalyst experiment (Examples 5 and 6), both chromium-based catalysts produce polymer.

Offline Feeding Tests

The previously disclosed slurries of Catalyst 1a, Catalyst 2, and the 30/70 mixture are fed from a syringe pump slurry feeder to a stainless steel beaker at various feed rates. The beaker is weighed periodically to verify that the mass feed rate is constant, that is, that the solids do not settle out of the slurry. All slurries appear to feed well without settling or line plugging.

Gas Phase Polymerization Examples

A gas phase polymerization reaction system substantially as described in U.S. Pat. No. 4,376,191 and U.S. Pat. No. 5,317,036 is used to prepare ethylene/1-hexene copolymers having densities of about 0.942 and 0.953–0.957 g/cm$^3$ and flow index (FI) values of about 8, and 37 respectively. Various techniques for feeding catalyst (dry or slurry), catalyst types (Catalyst 1a, 1b, 2 or 30/70 mixed), and reactor conditions are tested. In all cases, the slurry catalyst is found to run as well as dry catalyst, with comparable activity. Results are contained in Table 2.

TABLE 2

| | Comp. A* | Ex. 7 | Ex. 8 | Comp. B* | Ex. 9 | Comp. C* | Ex. 10 | Comp. D* | Ex. 11 | Comp. E* | Ex. 12 |
|---|---|---|---|---|---|---|---|---|---|---|---|
| Catalyst | 2 | 2 | 30/70 mixed | 1b | 1b | 1b | 1b | 1b | 1b | 1a | 1a |
| | Dry | Slurry | Slurry | Dry | Slurry | Dry | Slurry | Dry | Slurry | Dry | Slurry |
| Bed Temp (° C.) | 88 | 91 | 107 | 108 | 108 | 106 | 106 | 106 | 106 | 106 | 106 |
| C2 Par. Pres. psia (MPa) | 200 (1.4) | 200 (1.4) | 200 (1.4) | 200 (1.4) | 200 (1.4) | 200 (1.4) | 200 (1.4) | 200 (1.4) | 200 (1.4) | 200 (1.4)v | 200 (1.4) |
| C6/C2 mole ratio | .014 | 0.009 | 0.0017 | 0.0004 | 0.0004 | 0.0014 | 0.0016 | 0.0019 | 0.0019 | 0.0018 | 0.0018 |
| H2/C2 mole ratio | .0479 | 0.0499 | 0.3 | 0.099 | 0.1 | 0.0999 | .01 | .10 | 0.1 | 0.1 | 0.1 |
| O2/C2 ppmv | 0 | 0 | 0.029 | 0 | 0.0734 | 0.028 | .046 | 0.0079 | 0.01 | 0.076 | 0.0703 |
| Res. Time, h | 5.25 | 4.17 | 4.23 | 3.7 | 4.4 | 4.1 | 3.9 | 3.84 | 4.16 | 3.96 | 4.05 |
| I2 (MI) | | 0.069 | 0.626 | 0.661 | 0.581 | | 0.578 | 0.592 | 0.607 | 0.595 | 0.591 |
| I5 | 0.381 | 0.439 | 2.31 | 2.467 | 2.204 | 2.643 | 2.134 | 2.349 | 2.374 | 2.39 | 2.383 |
| I21 (FI) | 9.19 | 7.80 | 37.08 | 37.59 | 36.26 | 38.89 | 35.71 | 36.94 | 37.03 | 36.68 | 36.8 |
| MFR (I21/I2) | | 113 | 59 | 57 | 62 | | 61.8 | | | 62 | 62 |
| Density g/cc | 0.9439 | 0.9425 | 0.9529 | 0.9564 | 0.9577 | 0.9535 | 0.9537 | 0.9535 | 0.9537 | 0.9536 | 0.9538 |
| Bulk Density lb/ft$^3$ (kg/M$^3$) | 30.2 (483.2) | 31.1 (497.6) | 27.8 (444.8) | 25.1 (401.6) | — | 25.0 (400.0) | 27.5 (441.6) | 25.9 (414.4) | 26.1 (417.6) | 25.8 (412.8) | 26.8 (428.8) |
| Ash wt percent | 0.043 | 0.033 | 0.027 | 0.004 | | 0.008 | 0.009 | 0.006 | 0.010 | 0.009 | 0.010 |

*Comparative, not an example of the invention

Blow-Molding of Bottles

Bottles are blow molded from the resins produced in Table 2 and the environmental stress crack resistance (ESCR) properties measured. The results indicate equivalent or better ESCR properties for bottles made from resins prepared according to the present invention. Bottle properties are given in Table 3.

TABLE 3

| | Polymer Ex. | | | | | | | | |
|---|---|---|---|---|---|---|---|---|---|
| | 8 | B* | 9 | C* | 10 | D* | 11 | E* | 12 |
| ESCR 100 percent (hr) | 150 | 27 | 53 | 105 | 120 | — | — | — | — |
| ESCR 10 percent (hr) | 48 | 24 | 27 | 38 | 48 | 48 | 45 | 39 | 48 |
| Bottle Weight (g) | 80.3 | 74.7 | 76.2 | 74.4 | 75.1 | 73.7 | 77.4 | 75.3 | 78.4 |

*comparative, not an example of the invention

Example 13

A gas phase polymerization reactor is operated at steady state conditions feeding dry catalyst 1b at the reactor conditions disclosed for Comparative B. After approximately 18 hours operation, dry catalyst feed is discontinued and slurry catalyst 1b feed begins. All other reactor conditions are held constant. Upon commencement of slurry catalyst feed, and at the same average polymer production rate, static voltage measured in the reactor decreases for the duration of the test. This result is illustrated graphically in FIG. 1, which shows the decrease in static voltage measured at a level approximately 2 feet above the gas distribution plate upon replacement of dry catalyst feed with slurry catalyst feed.

The invention claimed is:

1. A process for reducing static charge generation in a gas phase reactor making polyethylene, the process comprising the steps of:
   A) mixing (i) at least one chromium-based catalyst on a silica support with (ii) mineral oil having a viscosity of at least 40 cP at 40° C. to form a slurry; and
   B) introducing the slurry into a gas phase polyethylene polymerization reactor.

2. The process of claim 1, wherein the chromium based catalyst is selected from the group consisting of: chromium oxide and silylchromate catalysts.

3. The process of claim 1, wherein the chromium-based catalyst is selected from the group consisting of chromic acetyl acetone, chromic chloride, chromic nitrate, chromic acetate, chromic sulfate, ammonium chromate, and ammonium dichromate.

4. The process of claim 2, wherein the silylchromate catalyst has at least one group of Formula I:

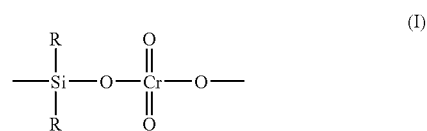

wherein R, each occurrence, is a hydrocarbyl group having from 1 to 14 carbon atoms.

5. The process of claim 4, wherein the silylchromate catalyst has the structure of Formula (II):

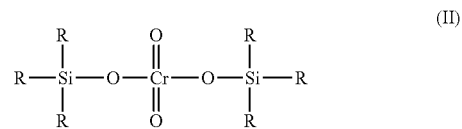

wherein R, each occurrence, is a hydrocarbyl group having from 1 to 14 carbon atoms.

6. The process of claim 5, wherein R is a hydrocarbyl group selected from the group consisting of methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, zylyl, naphthyl, ethylphenyl, methylnaphthyl, and dimethylnaphthyl.

7. The process of claim 4, wherein the silylchromate catalyst is selected from the group consisting of: bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri (tetradecyl) silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthyl silylchromate, polydiphenylsilylchromate, and polydiethylsilylchromate.

8. The process of any one of claims 1-7 which is a fluidized bed gas phase polymerization.

* * * * *